Oct. 12, 1971  D. L. AMSDEN ET AL  3,611,483
CONTAINER MAKING APPARATUS CONTROL SYSTEM
Filed March 19, 1970  2 Sheets-Sheet 1
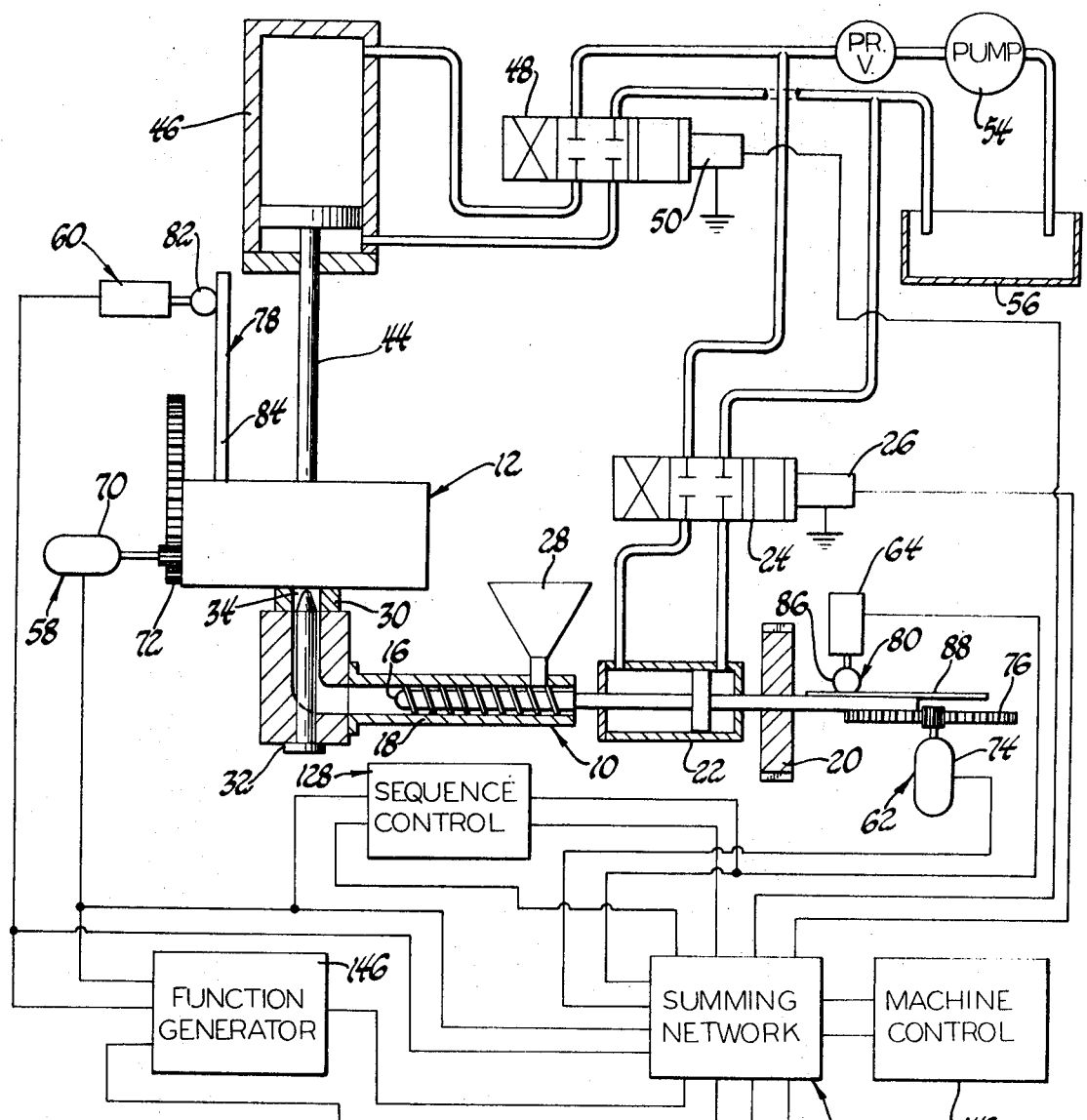
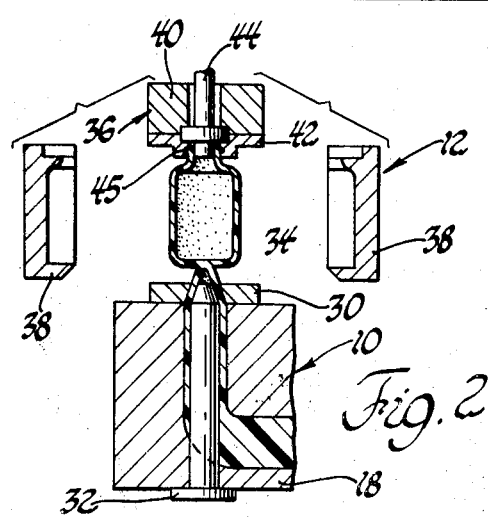
INVENTORS
Donald L. Amsden, &
By Casimir W. Nowicki
E. J. Holler & P. M. Rice
ATTORNEYS INVENTORS
Donald L. Amsden, &
BY Casimir W. Nowicki
E. J. Holler & P. M. Rice
ATTORNEYS United States Patent Office 3,611,483
Patented Oct. 12, 1971

3,611,483
CONTAINER MAKING APPARATUS CONTROL SYSTEM
Donald L. Amsden and Casimir W. Nowicki, Toledo, Ohio, assignors to Owens-Illinois, Inc.
Filed Mar. 19, 1970, Ser. No. 21,054
Int. Cl. B29c 3/06
U.S. Cl. 18—5 BC                                     11 Claims

ABSTRACT OF THE DISCLOSURE

A system for controlling the movements of a neck mold and an extruder ram for container making apparatus. Transducers sense velocity and position and develop feedback signals which are compared with command signals reflecting desired velocity and position. Error signals corresponding to the differences between the feedback and command signals are developed for adjusting the movements, if required. The system also correlates the velocity of the movements so as to maintain a predetermined velocity ratio between the movements of the neck mold and the extruder ram. As movements progress to different positions, a sequence control senses when the positions are reached and then adjusts the velocity of the movement with the next phase of the container making process.

---

This invention relates to improvements in control systems adapted, although not exclusively, for container making apparatus.

In the manufacture of containers, such as bottles from heat sensitive thermoplastic material, multiple step processes are conventionally used. For example, a process often utilized combines the steps of injection molding the neck of the container, extruding a tubular portion to form a blank, and then blowing the formed tubular blank to final configuration. Obviously, the apparatus and its controls for carrying out these steps must do so with precision to avoid irregularities in container wall thickness and shapes of the containers. This precision requirement becomes more difficult, particularly from a control standpoint if the container wall thickness is, instead of being uniform, to be of a variable thickness or different types and shapes of containers are to be made with a single apparatus.

With the foregoing problems in mind, a unique control system is contemplated that co-ordinates the extruding and molding steps for container making apparatus.

Also contemplated is a container making apparatus control system that can be operated by input command signals reflecting a desired program to be followed in making different type and size containers and that can use punched cards, tape and the like as a source of the input command signals.

Further contemplated is a novel control system for correlating movements of combination molding and extrusion apparatus to form precisely shaped containers with a desired thickness.

Another and related objective is a container making apparatus control system for controlling in a unique way, a sequence of operating steps whereby each step itself, as it concludes, causes the parameters for the next step to be established. A more specific and also related objective is such a control system wherein the actual position and a desired position for an apparatus moving member are compared and when in a predetermined relation, a parameter change is made so as to change the member's movements.

Also an objective is a container making apparatus control system that maintains a predetermined velocity ratio between the apparatus's extrusion and mold members.

Other objectives include the provision of a control system that is uncomplicated; that requires a minimum of components; and that is versatile so as to be adaptable to control the forming of a large variety of diversely shaped containers with uniform and/or variable wall thicknesses.

The foregoing and other objects and advantages of the invention will become apparent from the following description and the accompanying drawings, in which:

FIG. 1 is a schematic diagram of container making apparatus and a control system therefor which incorporates the principles of the invention;

FIG. 2 is a sectional view of a container mold assembly including neck and blow molds utilized in the FIG. 1 apparatus.

Figure 3:
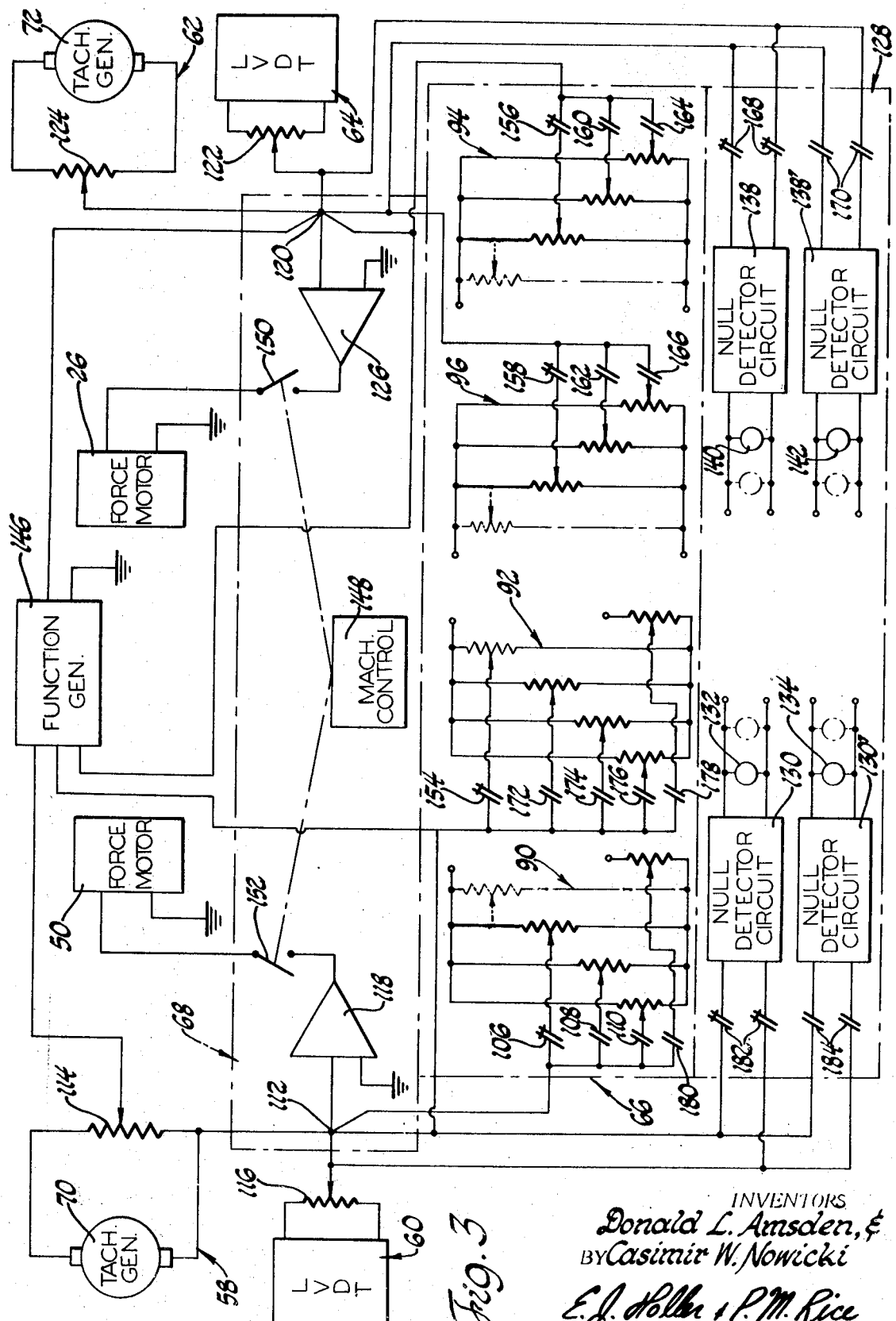
FIG. 3 is a circuit diagram of the FIG. 1 control system.

Referring first to FIG. 1, the apparatus displayed includes an extruder 10 and a mold mechanism viewed generally at 12. The extruder 10 and the mold mechanism 12 have their movements coordinated by a control system assigned the numeral 14. These movements, in a way well known, form containers of whatever shape and size is desired.

The extruder 10 and the mold mechanism 12 may be of the type shown and described in the patents to Gasmire 3,012,286 and Heider et al. 3,329,752. Briefly, the extruder 10 includes an extruder ram 16 housed within an extruder barrel 18. The extruder ram 16 is rotated by a drive gear 20 through suitable change speed gear mechanisms (not shown) and moved axially by a piston type fluid actuated motor 22. This extruder motor 22 is operated by an extruder motor control valve 24, which, in turn, is controlled by a force motor 26 of any commercially available type. A hopper 28 communicates with the extruder barrel 18 and contains the usual pelletized or articulate thermoplastic material. At the outlet from the extruder 10 is arranged an annular orifice collar 30 which combines with an interior core 32 to define a restricted annular extrusion orifice 34.

Referring now to FIG. 2, the mold mechanism 12 includes a neck mold 36 and a segmented blow mold 38. The neck mold 36 has neck mold sections 40 and 42 supported on a neck mandrel 44 through which air can be supplied from a suitable source (not shown). The neck mold section 42 in a way similar to the blow mold 38 is segmented so that a formed container can be released.

In operation, the extruder ram 16 is rotated to facilitate the plasticizing of the material within the extruder barrel 18. When the extruder ram 16 is moved leftwardly, as viewed in FIG. 1, by the extruder ram motor 22, assuming the neck mold 36 is positioned at the orifice 34, the plasticized material will be forced through the orifice 34 and into a cavity 45 of the neck mold 36. After the cavity 45 has been filled, a neck mold motor 46, which is connected to the neck mandrel 44, is operated by a neck mold control valve 48. This control valve 48 is controlled by a force motor 50 similar to the force motor 26 so as to cause the neck mold 36 to be elevated while the extruder ram 16 continues to be advanced. Then, a tube (see FIG. 2) is extruded after which the segmented blow mold 38 is closed on the tube. The extrusion stops but the extruder ram 16 continues to rotate. Since the pressure is inadequate to force the material through the orifice 34, there will be accordingly a pressure exerted on the ram 16 and it will force the ram 16 backwards so as to reaccumulate the material. Air under pressure is now applied through the neck mandrel 44 to the interior of the tube. This air blows it into its final configuration defined by the interior walls of the segmented blow mold 38 as depicted in FIG. 2. The segmented neck mold 42 and the segmented blow mold 38 are both opened to release the finished container after which the neck mold 36 is further elevated and then moved downward into engagement with the orifice 34 and the cycle repeated.

To carry out the foregoing sequence of events, the control system 14 functions to develop and supply proper error signals to the extruder and neck mold force motors 26 and 50. The extruder control valve 24 and the neck mold control valve 48 are operated so as to cause either fluid under pressure from an appropriate regulated pressure fluid source 54, e.g., a gear or vane type pump, to be supplied to the extruder and neck mold motors 22 and 46 or these motors 22 and 46 to be exhausted to a sump 56. To determine when and in what direction the extruder and neck mold motors 22 and 46 are to be operated, the velocity and the position of the neck mold 12 are continuously monitored respectively by neck mold velocity and position transducers 58 and 60. Similarly, the velocity and position of the extruder ram 16 are monitored by extruder ram velocity and position transducers 62 and 64. The velocity transducers 58 and 62 and the position transducers 60 and 64, respectively, provide velocity and position feedback signals, which are compared with velocity and position command signals from a command signal network 66 by a summing network 68. The summing network 68 then develops the proper error signals.

The neck mold and extruder ram velocity transducers 58 and 62 can be of any well known type. In FIG. 1 they are depicted as tachometer generators. The tachometer generator for the neck mold velocity transducer 58 is assigned the numeral 70 and is drive connected to the neck mold 36 by rack and pinion gearing 72. The tachometer generator for the velocity transducer 62 is assigned the numeral 74 and is drive connected to the extruder ram 16 by rack and pinion gearing 76.

The neck mold and extruder ram position transducers 60 and 64 can also be of any commercially available type. In FIG. 1, these transducers are shown as linear variable-differential transformers (hereinafter referred to as LVDT's). The LVDT for the neck mold position transducer 60 is denoted by the numeral 78 and the LVDT for the position transducer 64 by the numeral 80. The LVDT 78 has a fixed wiper element 82 and a movable resistance element 84 arranged for movement with the neck mold 36. The LVDT 80 has a fixed wiper element 86 and a movable resistance element 88 connected to the end of the extruder ram 16. The movable resistance elements 84 and 88 are connected across suitable sources of potential, not shown.

The command signal network 66 serves as a source of information by providing operational directions for the apparatus in the form of command signals. These command signals may be developed in different ways. In the FIG. 3 control system, voltage dividers are employed. For the neck mold 36 there is a velocity command voltage divider 90 and a position command voltage divider 92 and for the extruder ram 16, there is a velocity command voltage divider 94 and a position command voltage divider 96. The outputs of these voltage dividers 90, 92, 94 and 96 are connected to the summing network 68.

Only one of the voltage dividers requires detailed explanation since they are essentially the same. The neck mold velocity command voltage divider 90 is typical and includes one or more resistors 98 connected to an appropriate DC power supply 99 (FIG. 1), which can be a battery or an AC source with the proper rectification. The resistors 98 each have an adjustable contact such as contacts 100, 102, and 104. These adjustable contacts 100, 102, and 104 are, in a way to be described, connected by relay contacts 106, 108, and 110 to the output. It should be kept in mind that the number of resistors and adjustable contacts will be determined by the application of the apparatus and the number of commands that are to be given.

As will be appreciated by those versed in the art, these voltage dividers can be replaced with tape or punched cards; e.g., magnetic tape can be used having several channels, each providing a command voltage corresponding to that derived from one of the adjustable contacts 100, 102 or 104. In place of these adjustable contacts the tape would employ individual pick up heads. Similarly, the cards would provide the same channels and have read-heads replacing the pick up heads.

The summing network 68 compiles and evaluates the position and velocity information provided by the feedback and command signals. For the neck mold 36 this is done at a summing junction 112. The outputs from the neck mold velocity command and position command voltage dividers 90 and 92 are connected to this summing junction 112 as are the outputs from the neck mold velocity transducer 58 and the neck mold position transducer 60. If required, velocity and position transducers 58 and 60 can include in their outputs, adjustable resistors 114 and 116, respectively, for calibration and gain purposes. At the neck mold summing junction 112, the velocity feedback and velocity command signals are compared and if in a predetermined proportion; for instance, of the same magnitude but of opposite polarity so that there is a null, there will be no output. If there is a variation, i.e., other than a null, there will be an error signal developed which can be increased by an amplifier 118 and then supplied to the force motor 26 for the neck mold control valve 24.

The portion of the summing network 68 devoted to the extruder ram 16 operates in substantially the same way and includes a summing junction 120, which has the outputs from the extruder ram velocity command and position command voltage dividers 94 and 96 along with the outputs from the extruder ram position and velocity feedback transducers 64 and 62 connected to it. The position and velocity feedback transducers 64 and 62 may also have at their outputs adjustable resistors 122 and 124 respectively for calibration and gain adjustments. If an error signal is developed at the summing junction 120, it is increased in an amplifier 126 and thereafter supplied to the extruder ram force motor 26.

A sequence control 128 determines the sequence of events that are to occur with the apparatus; e.g., by changing the velocity of the neck mold 36 when it reaches different command positions, such as blow, head-up and high rise positions. For this purpose, the neck mold events are monitored by a comparator, such as one or more null detector circuits 130 and 130' which through appropriate switching logic, such as one or more relays 132 and 134, operate the command signal voltage divider contacts. The extruder ram events are monitored by one or more null detector circuits 138 and 138', which control one or more relays 140 and 142. For demonstration and explanatory purposes only, the relays 132, 134, 140 and 142 can be of the stepping type. The null detector circuits 130 and 138 can be bridge circuits. The null detector circuit 130, will have supplied to it the position feedback signal from the neck mold position transducer 60 and the position command signal from the neck mold position command voltage divider 92, whereas the null detector circuit 138 will have supplied to it the position feedback signal from the extruder ram position transducer 64 and the position command signal from the extruder ram position command voltage divider 96. When these signals have a predetermined relationship, e.g., they are equal, then the bridge circuit will sense this null relationship and will pulse the respective stepping relays 132, 134 and 140, 142. Each time pulsed these relays, as will be explained, will be operative to actuate the proper contacts in the command network 66 so as to change the velocity and/or position command signals.

If preferred and as those versed in the art will appreciate, the null detector circuits can operate, in the proper sequence, individual relays. These separate relays will have their energization and deenergization coordinated to carry out the successive events required to make containers.

The control system 14 also coordinates the velocities of the extruder ram 16 and the neck mold 36 by maintaining a predetermined velocity ratio. This is done by a suitable analog computer, such as a function generator 146, which has its input connected both to the neck mold velocity transducer 58 and the extruder ram velocity command divider 94. If upon computing the ratio between the neck mold velocity feedback signal and the extruder ram velocity command signal, the result is different from the desired preset ratio, a difference signal is developed and supplied to the summing junction 120 for the extrusion ram 16. When there are to be different velocity ratios, for instance, if the extruder ram 16 has its velocity constant while the neck mold 36 changes to several different velocities, the function generator 146 can be reset for the new ratio by utilizing each new position command signal from the neck mold position command voltage divider 92 to provide through switches or the like, the required parameters for each new ratio. In the alternative, separate function generators can be used for each ratio. Each new position command signal would by the stepping relays 132 and 134 or something similar, energize the proper function generator while deenergizing the one that had been operative.

The operation of the FIG. 3 control system will now be described. One should be mindful that the operation of the apparatus is subject to many variations both as to velocity and position, this all being determined by the shape and type of container to be formed. Therefore, this operational summary will be devoted to briefly describing the relationship of the different parts of the control system 14 during the more typical steps of making containers.

To commence operation, a suitable machine control 148 is actuated to close a switch 150, which for demonstration purposes only is shown between the amplifier 126 and the force motor 26 for the extruder ram control valve 24. The machine control 148 operates a similar switch 152 between the amplifier 118 and the force motor 50 for the neck mold control valve 48 but this switch 152 is maintained open for a timed period adequate for the neck mold 36 to be filled. With the velocity command voltage divider 90 as an example, the normally closed contact 106 will connect the adjustable contact 100 to the summing junction 112 so as to supply thereto a velocity command signal of the desired magnitude. Each of the other voltage dividers 92, 94, and 96 operate similarly and have initially normally closed contacts 154, 156, and 158, respectively, to provide the starting command signal voltages.

With the switch 150 closed, the velocity command voltage divider 94 and the position command voltage divider 96, respectively supply velocity command signals and position command signals to the summing junction 120 for the extruder ram 16. This will cause an unbalance or an error signal to be supplied by way of the amplifier 126 to the force motor 26 and commence the extruder ram operation. The extruder ram 16 will force the material into the neck mold 36 as it advances at a velocity determined by the comparison between the velocity command signal from the voltage divider 94 and the velocity feedback signal from the velocity transducer 62 and into a position determined by a comparison of the position command signal from the voltage divider 96 and a position feedback signal from the position transducer 64. It will be assumed that the extruder ram 16 is to proceed at a constant velocity; hence, there would be no new command signals.

If it is desired to change the velocity of the extruder ram 16 at a certain command position, the feedback position signal from the position transducer 64 will be compared in the null detector circuit 138 with the position command signal from the position command divider 96 and when null, the stepping relay 140 will be pulsed and become operative to open the normally closed contacts 156 and 158 and close another set of normally open contacts 160 and 162 from the voltage divider networks 94 and 96 respectively so that new velocity and position command signals are supplied to the summing junction 120 until the next command position is reached. At this next command position which occurs when the new position command signal and the feedback position signal are determined equal by the null detector circuit 138, the stepping relay 140 will again be pulsed. Now only contacts 164 and 166 will be closed. This can, as explained, continue for as many additional velocities and positions desired, simply by adding resistances to the voltage dividers 94 and 96 and, of course, the null detector circuit 138' can be used. One way to use the circuit 138' is to have stepping relay 140 open contacts 168 and close contacts 170 so as to respectively, deactivate the circuit 138 and activate the circuit 138', which in turn will pulse the stepping relay 142.

After the neck mold 36 is filled, which will correspond to the time delay provided by the machine control 148, the switch 152 is closed and now the error signals developed at the summing junction 112 are supplied to the force motor 50 for the neck mold control valve 48. Assuming that the neck mold 36 is to be elevated rapidly at a so called break-away velocity, the neck mold velocity command signal from the velocity command voltage divider 90 will provide the appropriate velocity command signal for this purpose. Also, the function generator 146 will be rendered operative, which can be done by the machine control 148 after the same time delay and start comparing the command velocity of the extruder ram 16 and the feedback velocity of the neck mold 36.

If at some subsequent position which will be determined by the position command voltage divider 92, the break-away velocity is, say, to be reduced to a coarse velocity, the neck mold position feedback signal and the neck mold position command signal when null as determined by the null detector circuit 130, will pulse the stepping relay 132 causing the velocity command voltage divider's normally closed contact 106 to be opened and its normally open contact 108 to be closed. The position command voltage divider 92 will be similarly changed; i.e., its normally closed contact 154 opened and a normally open contact 172 closed. Consequently, new velocity command and position command signals are supplied to the summing junction 112 and the neck mold 36 will be moved by the neck mold motor 46 at this coarse velocity until the next command position corresponding to the new position command signal is reached.

During this movement of the neck mold 36, the extruder ram 16 is operating at a constant velocity; keeping in mind that its velocity can be changed as previously mentioned and that the function generator 146 will continue to maintain the desired velocity ratio. Other adjustments in the velocity of the neck mold 36 can be made in the aforedescribed way. Assuming that the next command position is the blow position and it is desired to stop the neck mold 36 in its blow position, the position command signal from the neck mold position command voltage divider 92 is compared with the neck mold position feedback signal from the position transducer 60 by the null detector 130 and when a null is established, it causes the stepping relay 132 to be pulsed and first cause switching circuitry such as another relay in the machine control 148 to open the switches 150 and 152. This will stop movement of the neck mold 36 by the neck mold motor 46 until the blow operation is completed and also stop operation of the extruder motor 22. In the meantime, the contacts 108 are opened, the contacts 106 maintained open and the contacts 110 closed so that a velocity command signal from the adjustable contact 104 corresponding to another velocity is supplied to the summing junction 112. The position command voltage divider 92 is also changed by opening the contacts 172, maintaining the contacts 150 open and by closing the contacts 174 so that a new command signal is now provided corresponding to the next command position, which can be a high-rise position. When the blow operation is completed, the machine control 148 will close the switch 152 and the movement of the neck mold 36 to this high-rise position will be made. As before, when the position feedback and command signals are nulled, the null detector circuit 130 will again pulse the relay 132 so that now the machine control 148 is operated to open the switch 152 and stop the neck mold 36 in the high rise position where the container is removed.

At this same time the relay 132 can close contacts 176 in the position command voltage divider 92 and reclose the velocity command voltage divider contacts 106 so that upon reclosing the switch 152 after a timed interval the neck mold 36 can be moved to the head-up position at a rapid speed. If a different speed is wanted another contact can be added. As before at this head-up position, the null detector circuit 130 will sense the null and pulse the stepping relays 132 so as to reopen the switch 152 and stop the neck mold 36 in this position. This relay 132 can also prepare the system 14 for return of the neck mold 36 to its FIG. 1 starting position. One way and again for demonstration purposes only is to have the relay 132 close position command voltage divider contacts 178 and velocity command voltage divider contacts 180 so that opposite polarity command signals are supplied to the summing junction 112. These opposite polarity command signals will cause the downward movement of the neck mold 36. Also the null detector circuit 130' and its stepping relay 134 can now be used, if desired, by having the stepping relay 132 open normally closed contacts 182 and close normally open contacts 184. This will, as described with respect to the null detector circuits 138 and 138' deactivate the null detector circuit 130 and activate the null detector circuit 130'. When the neck mold 36 is back in the starting position the null detector circuit 130' will have sensed this so as to cause the machine control 148 to open the switch 152. As has been mentioned additional velocities can be introduced such as reducing the neck mold velocity as it approaches each stop particularly the FIG. 1 starting position by the addition of the proper resistances to the dividers 90 and 92.

From the foregoing, it will be appreciated that the control system of this invention does not require the use of timers for changing velocities at certain command positions. Timers, as is well known, must provide, to insure completion of an event, additional time, which, of course, is lost time. Also, limit switches, which become misaligned, are subject to wear, and are difficult to reposition or adjust, are avoided. With the control system of the invention, these adjustments can be easily made in the command network.

The invention is to be limited only by the following claims:

What is claimed is:

1. A control system for container making apparatus of the type having an extruder ram member and a neck mold member comprising, means maneuvering each member, controller means for the maneuvering means, the controller means including means sensing the respective velocities of movement of the members, means sensing the respective positions of the members, a source of velocity and position command signals corresponding to the desired velocities and positions of the members, means comparing the velocity and position feedback signals respectively with the velocity command and position command signals for the members and developing error signals for causing the maneuvering means to move the members in accordance with a predetermined scheme so as to make the containers.

2. A control system as described in claim 1, wherein the controller means further includes means correlating the velocities of the members so as to maintain a predetermined ratio therebetween.

3. A control system as described in claim 2, wherein the correlating means includes computer means comparing the ratio between certain movements of the members and the predetermined ratio and when different developing difference signals for causing the maneuvering means to move the members at approximately the predetermined ratio.

4. A control system as described in claim 1, and further including apparatus sequence control means sensing the position of one of the members and operative at certain positions thereof to cause the velocity of the member to be changed.

5. A control system as described in claim 1, further comprising apparatus sequence control means including switch means operative to connect different ones of the command signals to the comparing means and circuit means comparing the position feedback and position command signals applied to the comparing means for one of the members and when of a predetermined relationship being operative to actuate the switch means so as to cause the source to supply different position command and velocity command signals to the comparing means for the one member and thereby change the velocity thereof.

6. A control system as described in claim 2, further comprising apparatus sequence control means including switch means operative to connect different ones of the command signals to the comparing means and circuit means comparing the position feedback and position command signals applied to the comparing means for each member and when of a predetermined relationship being operative to actuate the switch means so as to cause the source to supply different position command and velocity command signals to the comparing means for the members and thereby change the velocity thereof.

7. A control system as described in claim 2 and further including apparatus sequence control means for successively changing the velocity of one of the members at certain positions thereof.

8. A control system for container making apparatus of the type having an extruder ram member and a neck mold member comprising motor means maneuvering each member, motor control means for operating each motor means, controller means for the motor control means, the controller means including a velocity sensing transducer for each motor means and operative to develop a velocity feedback signal corresponding to the velocity of movement of the associated member, a position sensing transducer for each motor means and operative to develop a position feedback signal corresponding to the position of the associated member, a source of velocity and position command signals corresponding to the desired velocities and positions of the members, summing means comparing the velocity and position feedback signals respectively with the velocity and position command signals for each member and developing error signals for causing the respective motor means to maneuver the associated member in accordance with a predetermined scheme so as to make the containers, correlating means including computer means comparing the ratio between the velocity of movements of the members and a predetermined ratio and when different developing different signals for causing one of the motor means to change the velocity of movement so as to proximate the predetermined ratio, apparatus sequence control means including switch means operative to connect different ones of the command signals to the comparing means and null detector means comparing the position feedback and position command signals applied to the comparing means for the one member and when of a predetermined relationship being operative to actuate the switch means so as to cause the source to supply different position command and velocity command signals to comparing means to the one member so as to change the velocity of the one member.

9. A control system for a container making apparatus comprising motor means for maneuvering a container forming member, controller means for the motor means, the controller means including means sensing the velocity of the movement of the member and developing a corresponding velocity feedback signal, means sensing the position of the member and developing a corresponding position feedback signal, a source of velocity and position command signals corresponding to the desired velocities and positions of the member, means comparing the velocity and position feedback signals respectively with the velocity command and position command signals for the member and developing error signals for supply to the motor means so as to cause the member to be moved according to a predetermined scheme by the motor means, and sequence control means sensing the position of the member and operative at certain positions thereof to change the velocity of the member.

10. A control system as described in claim 9, wherein the sequence control means includes switch means operative to connect different ones of the command signals to the comparing means and circuit means comparing the position feedback and position command signals applied to the comparing means and when of a predetermined relationship being operative to actuate the switch means so as to cause different position command and velocity command signals to be applied by the source to the comparing means so as to change the velocity of the member.

11. A control system as described in claim 10, wherein the switch means includes a series of relays each actuatable to connect one of the source command signals to the comparing means and the circuit means includes a null detector responsive to the position feedback and position command signals and operative when null is sensed to actuate one of the series of relays.

References Cited

UNITED STATES PATENTS

| | | | |
|---|---|---|---|
| 2,035,801 | 3/1936 | Gastrow | 18—30 CK UX |
| 3,122,782 | 3/1964 | Moore | 18—2 HA |

FOREIGN PATENTS

| | | | |
|---|---|---|---|
| 1,110,534 | 4/1968 | Great Britain | 18—30 CR |

H. A. KILBY, JR., Primary Examiner

U.S. Cl. X.R.

18—2 HA, 30 CK